United States Patent [19]

Kobayashi et al.

[11] Patent Number: 4,694,453
[45] Date of Patent: Sep. 15, 1987

[54] SYSTEM FOR ADJUSTING SIGNAL TRANSMISSION TIMING IN TIME-DIVISION MULTIPLEXING SIGNAL TRANSMISSION

[75] Inventors: Hiroshi Kobayashi, Tokyo; Hideaki Haruyama, Yokohama; Tsuguhiro Hirose, Nakamachi, all of Japan

[73] Assignee: Kabushiki Kaisha Toshiba, Kawasaki, Japan

[21] Appl. No.: 810,092

[22] Filed: Dec. 18, 1985

[30] Foreign Application Priority Data

Dec. 20, 1984 [JP] Japan .................................. 59-268824

[51] Int. Cl.⁴ ............................. H04J 3/02; H04J 1/16
[52] U.S. Cl. ...................................... 370/85; 370/13; 370/14
[58] Field of Search ....................... 370/85, 13, 67, 14, 370/17; 340/825.5

[56] References Cited

U.S. PATENT DOCUMENTS

| | | | |
|---|---|---|---|
| 4,562,573 | 12/1985 | Murano et al. | 370/85 |
| 4,569,042 | 2/1986 | Larson | 370/13 |
| 4,594,705 | 6/1986 | Yahata et al. | 370/13 |

FOREIGN PATENT DOCUMENTS

| | | |
|---|---|---|
| 1158739 | 12/1983 | Canada . |
| 0121410 | 4/1986 | European Pat. Off. . |
| 3333379 | 9/1983 | Fed. Rep. of Germany . |
| 2526249 | 4/1982 | France . |

OTHER PUBLICATIONS

Digest of Papers Compcon 82, 24th IEEE Computer Society International Conference, Feb. 22–25, 1982, pp. 182–186, The Institute of Electrical and Electronics Engineers, Inc., New York, U.S.; I. Kong, et al.: "Cablenet: A Local Area Network Reservation Scheme", *p. 185, right hand column, lines 4–46*.

IEEE International Conference on Communications, vol. 3, Jun. 13–17, 1982, pp. 6C.1.1–6C.1.5, New York, U.S.: J. O. Limb; "High-Speed Operation of Broadcast Local Networks", *p. 6C.1.2, left-hand column, line 33–p. 6C.1.3. right-hand column, line 18*.

Primary Examiner—Douglas W. Olms
Assistant Examiner—Curtis Kuntz
Attorney, Agent, or Firm—Oblon, Fisher, Spivak, McClelland & Maier

[57] ABSTRACT

A time-division multiplexing communication network comprising a central station and a plurality of local stations, in which information signals are transmitted from the local stations to the central station on a time-division multiplexing basis, and the central station transmits information signals to the local stations on a time-division multiplexing basis. The central station sequentially requests that local stations transmit a test signal in order to prevent collision of transmission signals from the local stations. Each local station, of which a test signal transmission is requested, transmits the test signal to the central station. The central station sends back the test signal to the local station which transmitted this test signal. The local station measures transmission delay time from transmission to reception of the test signal, and adjusts transmission timing of the information signal to be transmitted to the central station based on the measured delay time.

5 Claims, 18 Drawing Figures

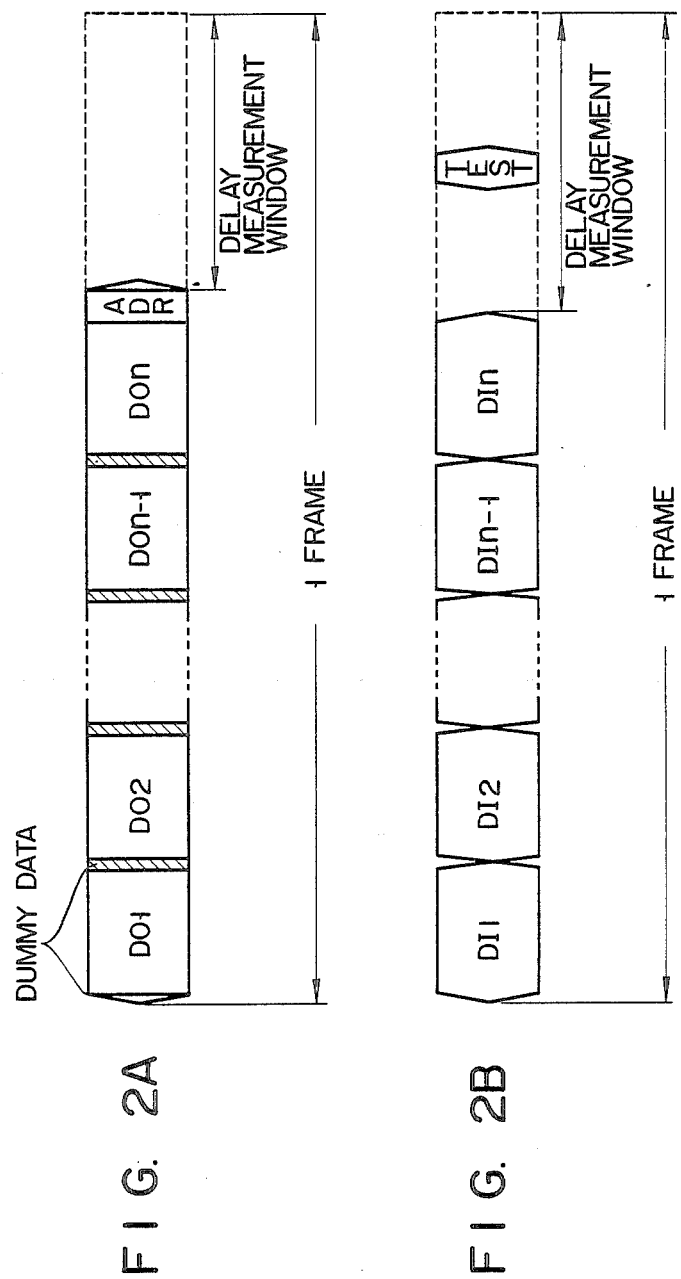

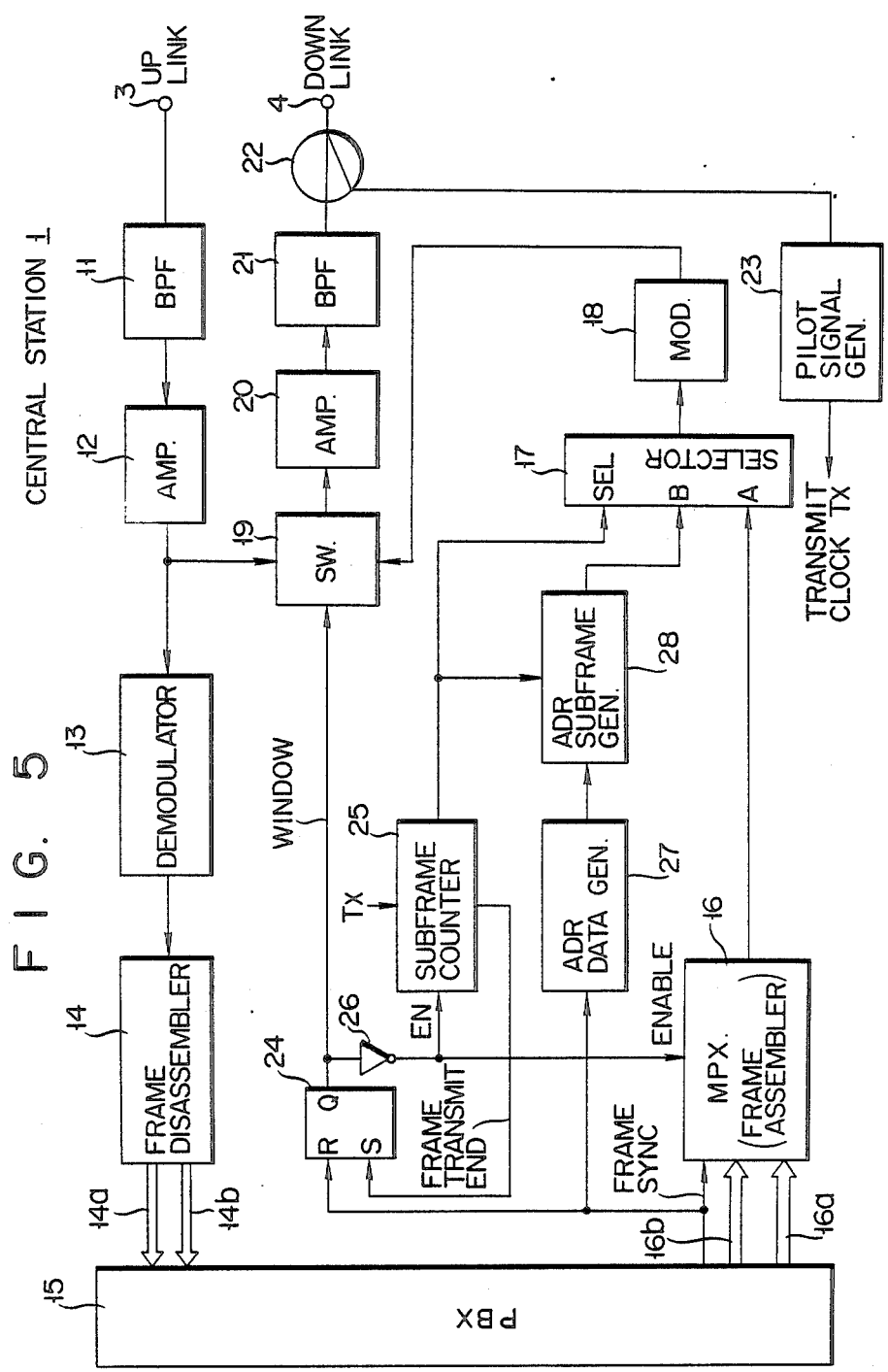
F I G. 5

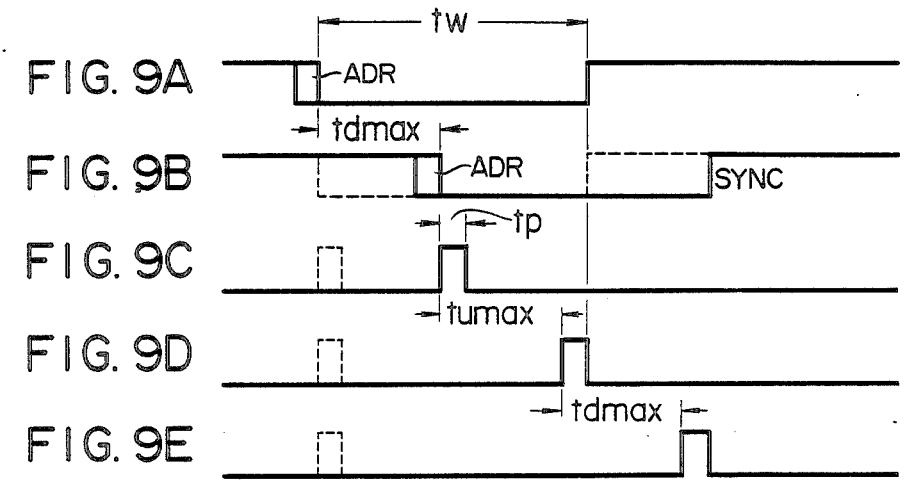
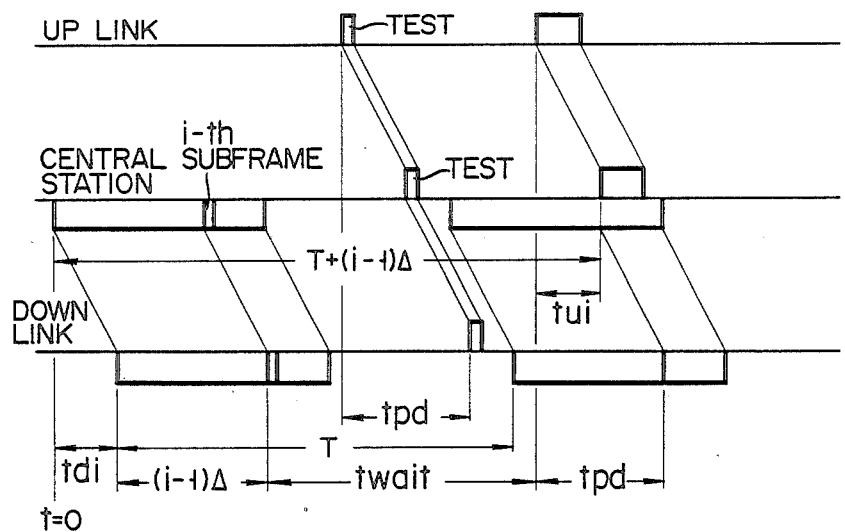

SYSTEM FOR ADJUSTING SIGNAL TRANSMISSION TIMING IN TIME-DIVISION MULTIPLEXING SIGNAL TRANSMISSION

BACKGROUND OF THE INVENTION

The present invention relates to a system for adjusting the timing of the signal transmissions in time-division multiplexing signal transmission.

When a communication network is constructed by coupling a plurality of terminals (e.g., telephone sets) to a private branch exchanging equipment (PBX), it is generally difficult to directly couple the terminals to the PBX.

A communication network has been realized where a local station having concentration and distribution functions is installed in an individual building or on an individual floor of a building, and each local station is linked to a PBX (central station) through up and down links. Signals are sent from the local stations to the PBX on a time-division multiplexing basis. For this reason, a flexible network can be constructed.

In such a network, local stations are coupled at different positions to a signal transmission path (up and down links) coupled to the central station. For this reason, transmission path length between the central station and the local station is different for each local station. Different transmission path lengths mean different transmission delay times, i.e., different times required for signal transmission. When signals are transmitted from a plurality of local stations to the central station through a common transmission path, it is very important to prevent collision of transmission signals from the local stations. In order to prevent collisions, the signal transmission timing in each local station must be adjusted while taking different transmission delay times for each local station into consideration.

However, if extra time is allowed for signal transmission as a result of simple consideration of the transmission delay time of each local station, utilization efficiency of the transmission path would be considerably degraded.

An improved system for adjusting signal transmission timings in local stations is disclosed in the copending U.S. patent application Ser. No. 594,896 filed Mar. 29, 1984 now U.S. Pat. No. 4,594,705; entitled "BUS-CONFIGURED LOCAL AREA NETWORK WITH DATA EXCHANGE CAPABILITY"; and assigned to the same assignee as this application. With this improved system, a central station sends a test signal to local stations in succession, and the local stations sequentially send back the received test signal to the central station. The central station measures transmission delay time between itself and each local station, and provides transmission delay time data to each local station so as to adjust its signal transmission timing.

However, in this system, a heavy load is imposed on the central station since it must measure the transmission delay times of the local stations and control the signal transmission timings. With the delay time adjustment operation of the central station, the extension of the local stations is difficult, resulting in poor network flexibility. When a local station sends back the test signal, its transmission timing may include a quantum error caused by operations of the local station, thus impairing precision in delay time measurement. For this reason, a slight time margin must be taken into consideration in order to ensure prevention of collision of signals from local stations.

SUMMARY OF THE INVENTION

It is an object of the present invention to provide an improved time-division multiplexing communication network system having a central station and local stations.

It is another object of the present invention to provide a time-division multiplexing communication network wherein each local staion measures transmission delay time between itself and a central station and adjusts the transmission timing of a signal to be transmitted to the central station.

According to the present invention, a time-division multiplexing communication network comprises a central station and a plurality of local stations and arranged such that the local stations transmit information signals to the central station on a time-division multiplexing basis, and the central station transmits information signals to the local stations.

According to the present invention, the central station comprises test signal transmission request means for transmitting a test signal transmission request signal to each of the local stations so as to request to transmit a test signal; and test signal sendback means for sending back the test signal to the local station which transmitted the test signal. Each local station comprises information signal detection means for detecting an information signal addressed to it and transmitted from the central station; test signal transmission means for transmitting a test signal to the central station in response to the test signal transmission request thereto from the central station; test signal detection means for detecting the test signal sent back from the central station thereto; transmission delay time measuring means for measuring the transmission delay time from transmission of the test signal until reception of the test signal sent back from the central station in response to the test signal transmission means and the test signal detection means; and information signal transmission means for transmitting an information signal to the central station at a timing designated by the transmission delay time measuring means in response to the transmission delay time measuring means and the information signal detection means.

BRIEF DESCRIPTION OF THE DRAWINGS

FIGS. 2A and 2B respectively show a one-frame information signal format transmitted from a central station to local stations and another one-frame information signal format transmitted from the local stations to the central station in the network shown in FIG. 1;

FIG. 5 is a schematic diagram of a central station (PBX) in FIG. 1;

FIGS. 9A and 9E are waveform diagrams for explaining a window period within one frame; and FIG. 10 is a timing chart for explaining signal transmission timing adjustment in a local station.

DESCRIPTION OF THE EMBODIMENTS

Figure 1:
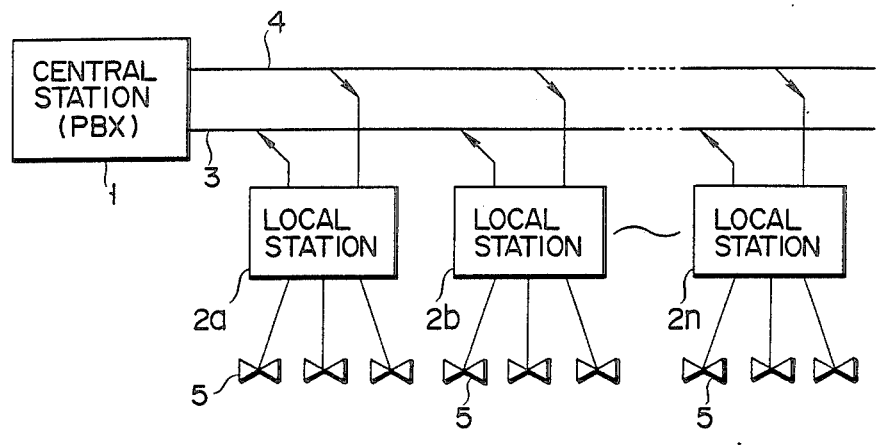
FIG. 1 schematically shows a configuration of a comunication network according to an embodiment of the present invention.

A communication network system of this invention using a PBX as a central station and concentrator/distributor equipment as local stations will be described hereinafter. As shown in FIG. 1, a central station 1 and a plurality of local stations 2a, 2b, ..., 2n are installed. In this embodiment, a bus-shaped signal transmission path having up and down links 3 and 4 is coupled to station 1. Stations 2a, 2b, ..., 2n are coupled to the signal transmission path at desired positions. A plurality of terminal devices 5 (e.g., telephone sets, data processing devices, or the like) are coupled to each local station. Numbers (addresses) are assigned to the respective local stations.

As shown in FIG. 2A, central station 1 sends transmission data (subframe data) DO1, DO2, ..., DOn with dummy data interposed therebetween, addressed to the respective local stations 2a, 2b, ..., 2n, onto down link 4 on a time-division multiplexing basis according to the order of the address numbers. Central station 1 receives transmission data DI1, DI2, ..., DIn transmitted from stations 2a, 2b, ..., 2n onto up link 3 at specified timings on a time-division basis, as shown in FIG. 2B. Station 1 transmits ADR subframe data including address data for specifying one local station immediately after last subframe data DOn. 1-frame of data transmitted from central station 1 is constituted by a data period during which subframe data DO1 to DOn and ADR subframe data are transmitted, and a window period with a predetermined time duration adapted for measuring transmission delay time associated with each local station.

As shown in FIG. 2B, 1-frame of data transmitted from local stations 2a to 2n to station 1 is constituted by a data period during which subframe data DI1 to DIn are transmitted from the corresponding local stations, and a window period following subframe data DIn. When addressed by address data ADR, a local station sends a test signal during the window period within one-frame period. The central station sends back the test signal during the window period in the data frame to the local stations. The local station measures the transmission delay time between itself and the central station upon reception of the test signal originally sent from this local station. By measuring the transmission delay time, the local station adjusts a signal transmission timing, thus preventing collision of signals from the local stations.

Assume that in the network shown in FIG. 1, a maximum of 31 local stations 2 can be coupled to the network, and a maximum of four terminal devices 5 can be connected to each local station. In this case, subframe data addressed to each local station 2 has 40 bits in total, i.e., a 2-bit sync signal: 4-bit control data: 8-bit PCM audio data for 4 channels; and 2-bit dummy data. The sync signal has a binary code "10". If the ADR subframe has 10 bits and the window period consists of 284 bits + 2 bits (corresponding to leading and trailing edges of the window), one frame has a 1536 bit length. Assuming that the one-frame time duration is 124 usec, the signal clock rate is 1536/125 μsec = 12.288 MHz. The subframes and one frame of data transmitted from local stations 2a to 2n to central station 1 have the same structure as those transmitted from the central station to the local stations 2.

Figure 4:
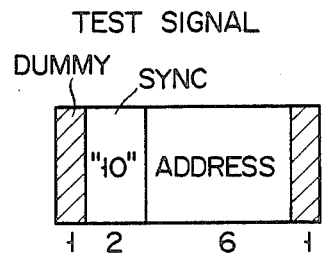
FIG. 4 shows a format of a test signal subframe and an ADR subframe.

FIG. 4 shows a test signal subframe format. As shown in FIG. 4, the test signal has 10 bits, i.e., 2-bit dummy data; a 2-bit sync signal (10); and 6-bit address data (local station number). The ADR subframe data sent from station 1 has the same format as above.

In order to accurately measure the transmission delay time of each local station, a pilot signal is sent from central station 1, and modulated data signals are superimposed on the pilot signal to be transmitted over the signal transmission path. The frequency of the pilot signal is set to an integer multiple of the clock rate, e.g., 12.288 × 20 = 245.76 MHz. In this case, the transmission delay time can be measured with precision on the order of 1/10 to 1/20 of one bit time.

Figure 6:
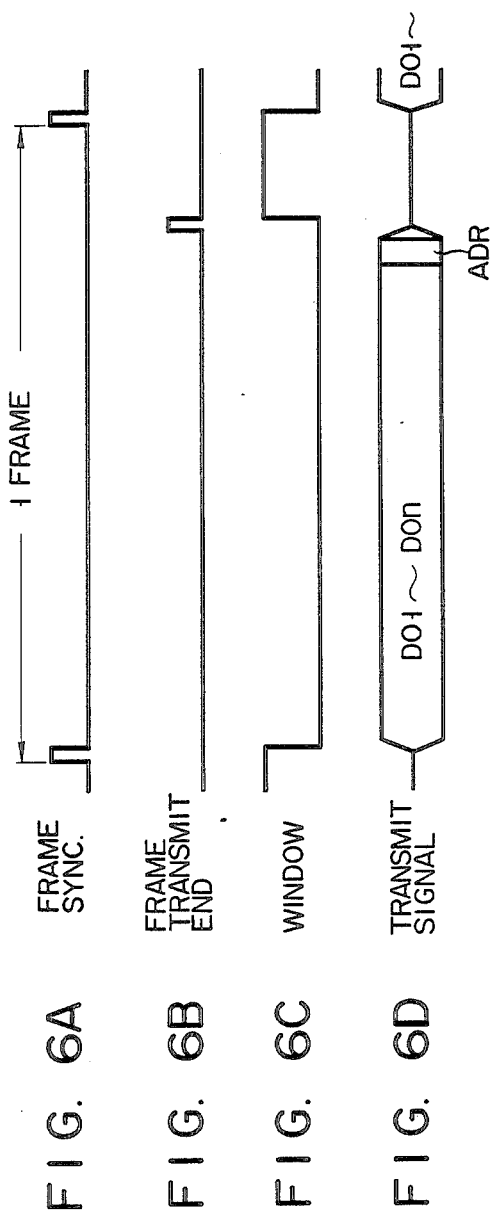
FIGS. 6A and 6D are waveform diagrams for explaining the operation of the central station.
Figure 7:
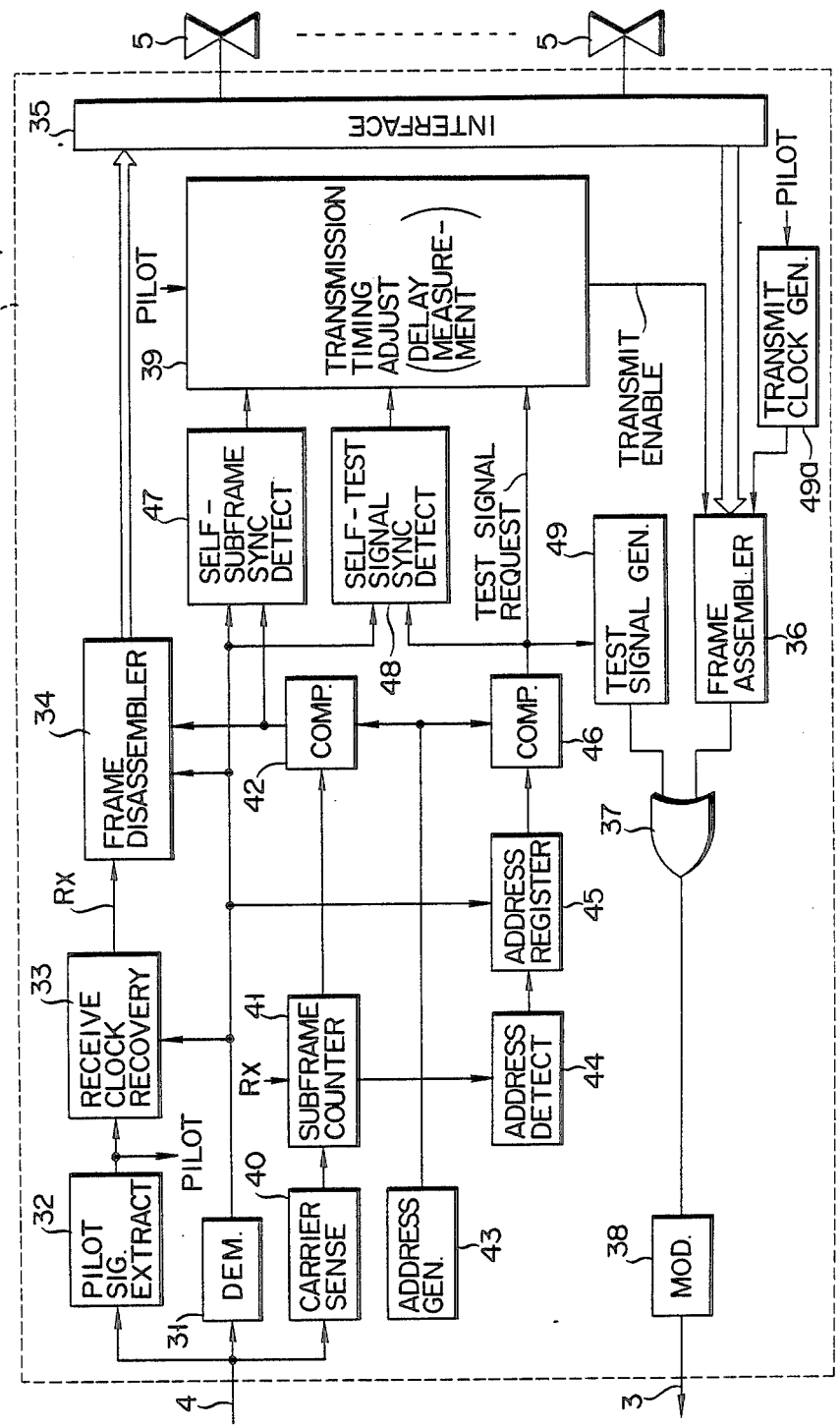
FIG. 7 is a schematic block diagram of a local station in the network in FIG. 1.

The arrangement of central station 1 and local station 2 will be described with reference to FIGS. 5, 6 and 7. In central station 1 shown in FIG. 5, a signal transmitted from a local station 2 over up link 3 has its unwanted frequency band removed by a bandpass filter 11, and then is amplified by an amplifier 12 to a predetermined level. The received signal is demodulated by a demodulator 13, and then applied to a distributor (frame disassembler) 14. Frame disassembler 14 disassembles the signals transmitted from local stations 2a to 2n, and supplies PCM audio data and control data to PBX 13 through PCM highway 14a and data highway 14b.

In PBX 15, the signals from local stations 2 are subjected to exchange processing. The PCM audio signals and control data from PBX 15 are supplied to multiplexer (frame assembler) 16 through PCM highway 16a and data highway 16b. In response to a frame sync signal, frame assembler 16 assembles input signals in the format shown in FIG. 2A. Output signals of frame assembler 16 are applied to a modulator 18 through a selector 17, to be modulated by a predetermined modulation system e.g., FSK (frequency shift keying) system.

The modulated data signal from modulator 18 is supplied to a switching circuit 19 together with the received data signal from amplifier 12. Switching circuit 19 selectively supplies the output signal from modulator 18 or amplifier 12 to an amplifier 20 in response to a window signal. An output signal of amplifier 20 is coupled to down link 4 through a bandpass filter 21 and a coupler 22. During the window period of one frame, switching circuit 19 supplies onto down link 4 an output signal from amplifier 12 i.e., the test signal transmitted from a local station over up link 3.

A pilot signal generator 23 is provided, which always sends a 245.76-MHz sinusoidal pilot signal onto down link 4 through coupler 22. The modulated data signal is superimposed on the pilot signal, and is transmitted over down link 4. Pilot generator 23 also generates 12.288-MHz transmission clock signal Tx, which is phase-locked with the pilot signal.

Selector 17 selectively supplies subframe data signals DO1 to DOn from assembler 16 assigned to local stations 2a to 2n during a data signal transmission period in the 1-frame period, or the ADR subframe signal to modulator 18. The frame sync signal, having a cycle period of 1 frame interval and, shown in FIG. 6A, is applied to a reset terminal of a flip-flop 24 as well as to frame assembler 16. The Q output of flip-flop 24 thus goes low, as shown in FIG. 6C. The Q output of flip-flop 24 is coupled to switch circuit 19 as the window signal. When the window signal is low, switch circuit 19 selects an output signal of modulator 18. As shown in FIG. 6D, the data signals (DO1 to DOn and ADR) are transmitted from central station 1 over down link 4.

When flip-flop 24 is reset, a subframe counter 25 for counting the subframe signals being transmitted is enabled through an inverter 26. At the same time, frame assembler 16 is enabled to initiate the transmission of subframe data DO1 to DOn. Subframe counter 25 comprises a 40-scale counter which corresponds to the number of bits "40" of one subframe data and counts transmission clock Tx, and an n-scale counter which corresponds to the number n of subframes transmitted from assembler 16 and counts outputs of the 40-scale counter. When n subframes are counted by the n-scale counter, ADR subframe generator 28 is enabled to send the ADR subframe to selector 17. At the same time, counter 28 causes selector 17 to send the ADR subframe to modulator 18.

An ADR data generator 27 is provided, which supplies ADR data (an address number of each local station) to generator 28. Generator 28 produces the ADR subframe in accordance with the format shown in FIG. 4. Generator 27 is a counter for counting the frame sync signal and is incremented every one-frame period. Thus, the address of a local station, to which test signal transmission is requested, is sequentially updated at one-frame time intervals.

Counter 25 is arranged to supply a FRAME TRANSMIT END signal (FIG. 6B) to the reset terminal of flip-flop 24 at the completion of transmission of the ADR subframe to selector 17. As a result, flip-flop 24 is reset, and as shown in FIG. 6C, the window signal goes low. Switching circuit 19 is then set in the standby state for sending back the test signal received from the local station to which the test signal transmission is requested.

Figure 3:
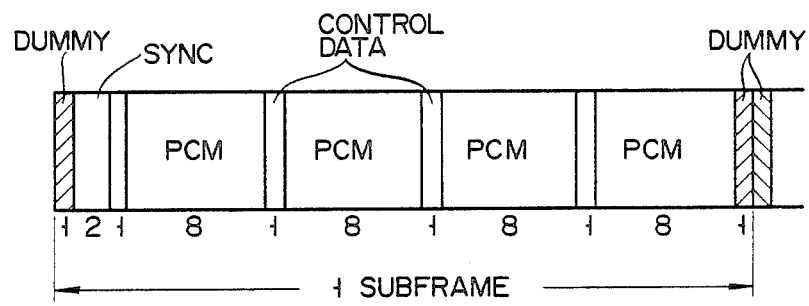
FIG. 3 shows a format of subframe information signal.
Figure 8:
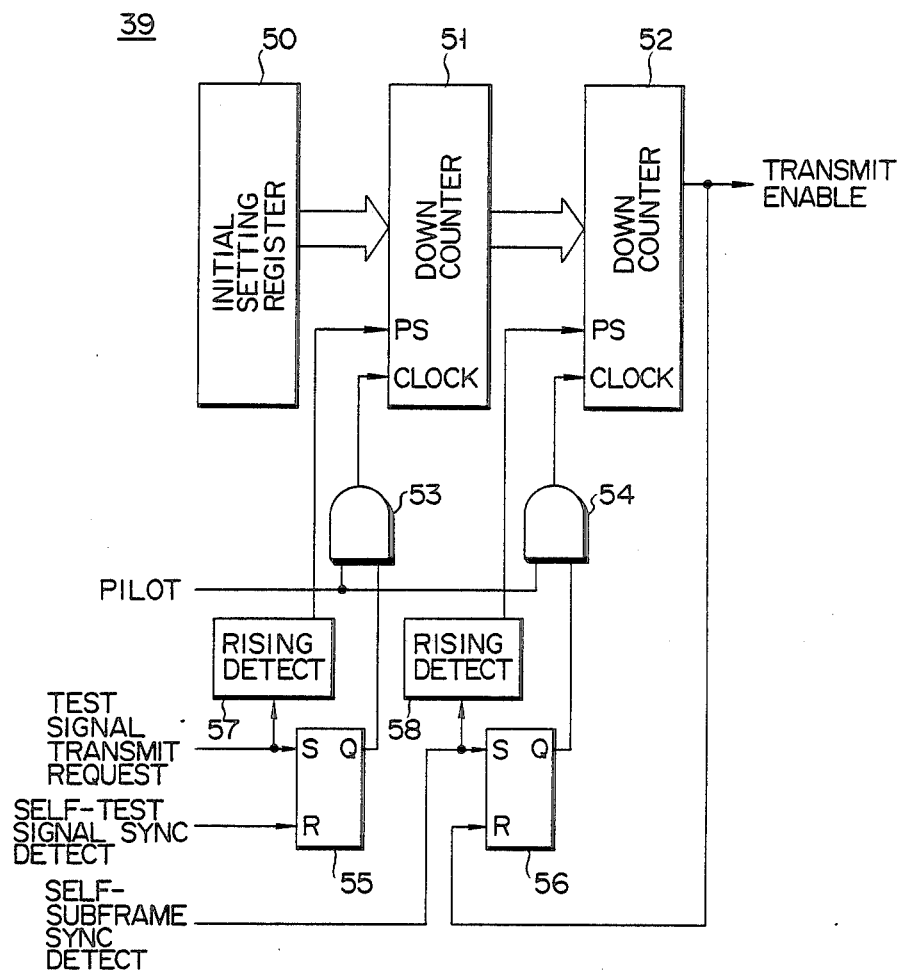
FIG. 8 is a schematic block diagram of a signal transmission timing adjust circuit in FIG. 7.

The arrangement of the local station will be described with reference to FIGS. 7 and 8. FIG. 7 shows the arrangement of the local station, and FIG. 8 shows the arrangement of the transmission timing adjust (transmission delay time measurement) circuit. Referring to FIG. 7, the frame signal having the format shown in FIG. 2A is transmitted through down link 4 and is supplied to demodulator 31 to be demodulated. Pilot signal extract circuit 32 extracts the pilot signal from the signal transmitted through down link 4. Circuit 32 may be comprised of a bandpass filter. The output of demodulator 32 is connected to a receive clock recovery circuit 33. Circuit 33 recovers reception clock Rx phase-locked with the pilot signal extracted from the output signal of demodulator 31. A frame diassembler 34 disassembles the received subframe data in response to the recovered reception clock, and supplies the disassembled data to terminal devices 5 through an interface 35. Interface 35 supplies data from terminal devices 5 to a frame assembler 36. Assembler 36 assembles the data from devices 5 in accordance with the format shown in FIG. 3 in response to the transmission clock phaselocked with the pilot signal from transmission clock generator 49a. The output signal of assembler 36 is supplied to modulator 38 through OR gate 37 to be modulated by the FSK method. The modulated subframe data is sent onto up link 3. According to the present invention, frame assembler 36 is enabled by a TRANSMIT ENABLE signal from transmission timing adjust circuit 39 to transmit the subframe data. The transmission timing of the subframe data is adjusted based on the time interval between transmission and reception of the test signal.

The circuit arrangement for adjusting the transmission timing of the subframe data according to the present invention will now be described. A carrier sense circuit 40 monitors down link 4, and, when sensing an incoming modulated data signal, issues a carrier sense signal to a subframe counter 41. Counter 41 is enabled by the carrier sense signal to count reception clock Rx from reception clock recovery circuit 33. Counter 41 may be arranged like subframe counter 25 in central station 1. The subframe count output of counter 41 is coupled to a comparator 42. Counter 41 is also coupled to an address detector 44, which produces an address detection signal at a reception time of the ADR subframe. In response to the address detection signal, address register 45 fetches address data in the ADR subframe being received. The output of address register 45 is coupled to comparator 46. An address generator 43 provides an address number assigned to each of local stations. Address generator 43 is coupled to comparators 42 and 46.

Comparator 42 compares the count of counter 41 with the address number set by generator 43 to generate a self subframe detection signal at a reception time of the self subframe data in subframe data DO1 to DOn transmitted to local stations 2a to 2n. The self-subframe detection signal enables frame disassembler 34 to disassemble the self-subframe data. The disassembled data is supplied to terminal devices 5 through interface 35. The output of comparator 42 enables a self-subframe sync detection circuit 47 to detect the sync signal included in the self-subframe data. The detection output signal of detection circuit 47 is supplied to a transmission timing adjust circuit 39.

Comparator 46 compares the address data in the ADR subframe loaded in address register 45 with the address set by generator 43. Upon detection of a coincidence of the addresses, comparator 46 generates a TEST SIGNAL TRANSMISSION REQUEST signal, which is supplied to circuit 39 and test signal generator 49. The output of comparator 46 enables self-test signal sync detector 48 to detect the sync signal included in the test signal transmitted by the corresponding local station and sent back from station 1. A self-test signal sync detection signal from detector 48 is supplied to circuit 39. Detectors 47 and 48 are arranged to detect transition from "1" to "0" in the sync signal "10".

Test signal generator 49 is enabled by the TEST SIGNAL TRANSMISSION REQUEST signal to initiate the transmission of the test signal subframe with the format shown in FIG. 4. Evidently, the test signal subframe is transmitted during the window period.

Referring now to FIG. 8, transmission timing adjust (transmission delay time measurement) circuit 39 will be described. An initial setting register 50 is provided into which 1-frame time duration T is preset. When the test signal transmission request is detected by comparator 46, flip-flop 55 is set. As a result, AND gate 53 is enabled by the Q output of flip-flop 55 to apply the extracted pilot signal to the clock terminal of down counter 51. The leading edge of the TEST SIGNAL REQUEST signal is detected by detector 57, and the leading edge detection signal is supplied to the preset terminal of down counter 51. When the test signal transmission request is detected, the transmission of the test signal subframe begins, as described above. The test signal is sent to central station 1 through up link 3, and is sent back from station 1 through down link 4.

When detector 48 detects the sent back test signal, the SELF-TEST SIGNAL SYNC DETECT signal resets flip-flop 55. As a result, AND gate 53 is disabled, then stopping the count operation of counter 51. The count of counter 51 at this time indicates a time duration between transmission and reception of the test signal. The transmission delay time between each local station and the central station is thus measured.

When the subframe data assigned to the corresponding local station is detected from subframe data DO1 to DOn transmitted from station 1 by detector 47, the SELF-SUBFRAME SYNC DETECT signal sets flip-flop 56. As a result, AND gate 54 is enabled to supply the pilot signal to down counter 52. When the leading edge of the SELF-SUBFRAME SYNC DETECT signal is detected by detector 58, the detection signal is supplied to a present terminal of down counter 52. The transmission delay time data held in counter 51 is loaded into counter 52. When the self-subframe data is detected, counter 52 begins to be counted down. When counted down to zero, counter 52 issues the TRANSMIT ENABLE signal, which is applied to the reset terminal of flip-flop 56. Upon resetting of flip-flop 56, AND gate 54 is disabled, thus stopping the count operation of counter 52. When the TRANSMIT ENABLE signal is issued, frame assembler 36 starts transmitting the subframe data.

Transmission delay time measurement and adjustment of the signal transmission timing based on the measured transmission delay time in the network of the present invention will be described.

Window period tw necessary for transmission delay time measurement shown in FIGS. 9A to 9E must be set to satisfy the following conditions. Assume that the maximum transmission delay time on down link 4 observed between central station 1 and the farthest local station 2 is given by tdmax, the maximum delay time on up link 3 is given by tumax, and the minimum delay time between the nearest local station 2 and central station 1 is given by tdmin (=0). Furthermore, the test signal with a time duration tp is transmitted at the beginning of window period tw in each local station.

As shown in FIG. 9A, when a frame signal is transmitted from central station 1 onto down link 4, the farthest local station receives this frame signal after a delay of tdmax, as shown in FIG. 9B. When the farthest local station is requested to transmit the test signal, the local station transmits the test signal with time duration tp at the beginning of the window period, as shown in FIG. 9C. The test signal is received by central station 1 after a delay of tumax. In order to send back the test signal received by central station 1 without colliding with any data signal, window period tw in central station 1 must be set to be not less than a sum of tdmax, tumax and tp. As shown in FIG. 9E, in order for the test signal to be received by the farthest local station from station 1 after a delay of tdmax, the window period of the local station must be set as described above. Each local station can precisely measure the transmission delay time during the window period tw irrespective of a distance from central station 1 when window period tw is set as follows:

$$tw \geq tdmax + tumax + tp$$

As indicated by broken lines in FIGS. 9, the local station having a delay time of 0 can measure the transmission delay time during the window period.

Delay time measurement in local station 2i, to which address number i is assigned, will be described with reference to FIG. 10. When central station 1 begins to send a one-frame signal at t=0, local station 2i receives this one-frame signal after a delay of tdi. If a time duration of each subframe is given by $\Delta$, station 2i receives the subframe addressed thereto after $tdi+(i-1)\Delta$.

On the other hand, local station 2i must start transmission of the signal at a time of $T+(i-1)\Delta$, tui, in order that central station 1 receives the signals from stations 2a to 2n after one-frame time duration T, and receives the subframe data from station 2i at a time of $T+(i-1)\Delta$. This means that local station 2 may start transmission of a signal at $T+(i-1)\Delta$. tui when it receives a signal addressed to itself at $tdi+(i-1)\Delta$. Therefore, as shown in FIG. 10, signal collision on down link 4 can be reliably prevented if station 2i begins to transmit a signal after the following waiting time from reception of the signal addressed thereto:

$$T_{wait} = [T + (i - 1)\Delta - tui] - [tdi + (i - 1)\Delta]$$
$$= T - (tui + tdi) = T - tpd$$

Referring again to FIG. 8, in the transmission timing adjust circuit of local station 2i, data corresponding to one-frame time duration T is loaded into register 50. Counter 51 is counted down to $T-(tui+tdi)$ after T has been preset therein. $T_{wait}=T-(tui+tdi)$ is preset in counter 52. Upon counting down from $[T-(tui+tdi)]$ to 0, counter 52 issues the TRANSMIT ENABLE signal.

Although FIG. 1 shows a bus-shaped network, the present invention may be applied to a star-shaped network. For the transmission path, a base-band transmission path, a frequency multiplex transmission path having different transmission frequency bands on up and down links, and an optical transmission path may be utilized. Alternatvely, a wireless transmission system may be utilized. The subframe length need not be constant but may be variable. In this case, each local station can adjust a signal transmission timing with reference to a sync detection timing of a subframe addressed to itself.

In the above embodiment, although information signals are transmitted over the up link on a time-division multiplexing basis, information signals need not be transmitted over the down link from the central station to the local stations on a time-division multiplexing basis as shown in FIG. 2A. In this case, one frame signal transmitted over the down link to the local stations may include a dummy signal, a sync signal, a destination address, a data signal and a window, which is addressed to one local station. Each local station may be arranged to transmit, after measuring its delay time tpd, its subframe signal at a time of $T_O+$self-address number x subframe time length, where $T_O$ is a time which is tpd prior to the detection timing of a first sync signal transmitted over the up link.

We claimed:
1. A communication network system comprising:
   a central station;
   a plurality of local stations coupled to different positions on a signal transmission path one end of which is coupled to said central station, wherein subframe information signals addressed to the respective local stations are transmitted over said signal transmission path from said central station to said local stations during a data period of one frame transmission interval including the data period and a window period following the data period, and subframe information signals are transmitted from said local stations to said central station over said signal transmission path during a data period of one frame transmission interval including the data period and a window period following the data period;

said central station comprising, information signal transmission means for transmitting over said signal transmission path, on a time division multiplexing basis, subframe information signals addressed to the respective local stations during the data period of one transmission frame interval, test-signal transmission-request means for transmitting over said signal transmission path a test-signal transmission-request signal, addressed to one of said local stations, subsequent to the last subframe information signal transmitted during the data period of one frame transmission interval, test signal sendback means for sending a test signal back to a local station which transmitted the test signal over said signal transmission path;

each of said local stations comprising, information signal detecting means for detecting a subframe information signal transmitted from said central station and addressed to itself, test signal transmission means responsive to a test-signal transmission-request signal transmitted from said central station and addressed to itself for transmitting a test signal to said central station during the window period of one transmission frame interval, test signal detecting means for detecting the test signal sent back from said central station, transmission delay time measuring means responsive to said test signal transmission means and said test signal detection means for measuring a transmission delay time required from the transmission of the test signal to the reception of the test signal sent back from said central station, and information signal transmission means responsive to said transmission delay time measuring means and said information signal detection means for transmitting a subframe information signal to said central station over said signal transmission path after a waiting time, depending on a time duration of one transmission frame interval and the transmission delay time measured by said transmission delay time measuring means, from a time of the reception of the subframe information signal addressed to itself.

2. A communication network system according to claim 1, wherein the waiting time is represented by T-tpd, wherein T is the time duration of one transmission frame interval and tpd is the transmission delay time measured by said transmission delay time measuring means.

3. A network according to claim 6, wherein
said local stations are assigned with address numbers, and said central station transmits the information signals addressed respectively to said local stations in accordance with the order of the address numbers.

4. A network according to claim 1, wherein
said central station comprises pilot signal transmission means for transmitting to said local stations a pilot signal having a frequency higher than a clock rate of information signals transmitted to said local stations, so that the information signals are superimposed on the pilot signal, and
said transmission delay time measuring means in each of said local stations is arranged to count the pilot signal transmitted from said central station for measuring the transmission delay time.

5. A network according to claim 2, wherein
said local stations are assigned with address numbers, the test signal transmission request signal transmitted from said central station to said local stations carries address number data assigned to a local station, and the test signal transmitted from each of said local stations carries address data assigned to the corresponding local station.

* * * * *